United States Patent
Chen

(10) Patent No.: US 9,568,784 B2
(45) Date of Patent: Feb. 14, 2017

(54) LIQUID CRYSTAL DISPLAY PANEL AND DRIVING METHOD THEREOF

(71) Applicants: ORDOS YUANSHENG OPTOELECTRONICS CO., LTD., Ordos, Inner Mongolia (CN); BOE TECHNOLOGY GROUP CO., LTD., Beijing (CN)

(72) Inventor: Junsheng Chen, Beijing (CN)

(73) Assignees: ORDOS YUANSHENG OPTOELECTRONICS CO., LTD., Ordos, Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 296 days.

(21) Appl. No.: 14/344,193

(22) PCT Filed: Nov. 12, 2013

(86) PCT No.: PCT/CN2013/086903
§ 371 (c)(1),
(2) Date: Mar. 11, 2014

(87) PCT Pub. No.: WO2014/183394
PCT Pub. Date: Nov. 20, 2014

(65) Prior Publication Data
US 2016/0124276 A1   May 5, 2016

(30) Foreign Application Priority Data

May 17, 2013   (CN) .......................... 2013 1 0184540

(51) Int. Cl.
*G02F 1/136* (2006.01)
*G02F 1/1343* (2006.01)
(Continued)

(52) U.S. Cl.
CPC ....... *G02F 1/134336* (2013.01); *G02F 1/1368* (2013.01); *G02F 1/13306* (2013.01);
(Continued)

(58) Field of Classification Search
CPC ................. G02F 1/13624; G02F 2001/134372
See application file for complete search history.

(56) References Cited

U.S. PATENT DOCUMENTS

2005/0099569 A1   5/2005   Moon et al.
2007/0285369 A1   12/2007   Park et al.
(Continued)

FOREIGN PATENT DOCUMENTS

CN   101762917 A   6/2010
CN   101770125 A   7/2010
(Continued)

OTHER PUBLICATIONS

Written Opinion of the International Searching Authority dated Feb. 17, 2014; PCT/CN2013/086903.
(Continued)

*Primary Examiner* — Phu Vu
(74) *Attorney, Agent, or Firm* — Ladas & Parry LLP

(57) ABSTRACT

The embodiments of the present invention provide a liquid crystal display panel and driving method thereof. The liquid crystal display panel may comprise a substrate and a plurality of first electrodes and a plurality of second electrodes disposed on the substrate to generate a driving electrical field, wherein each of the first electrodes is disposed in two pixel units which are adjacent in a first direction, and each of the second electrodes is disposed in two pixel units which are adjacent in the first direction, the first electrodes and the second electrodes are disposed alternately by offsetting one pixel unit in the first direction, and the first direction is a row direction or a column direction.

15 Claims, 3 Drawing Sheets

(51) Int. Cl.
 *G02F 1/1362* (2006.01)
 *G02F 1/133* (2006.01)
 *G02F 1/1368* (2006.01)

(52) U.S. Cl.
 CPC .... *G02F 1/13624* (2013.01); *G02F 1/134363* (2013.01); *G02F 1/136213* (2013.01); *G02F 1/136286* (2013.01); *G02F 2001/134345* (2013.01); *G02F 2001/134372* (2013.01); *G02F 2001/134381* (2013.01)

(56) References Cited

U.S. PATENT DOCUMENTS

| | | | |
|---|---|---|---|
| 2008/0055526 A1* | 3/2008 | Ino | G02F 1/133555 349/114 |
| 2009/0135125 A1 | 5/2009 | Park | |
| 2012/0154716 A1 | 6/2012 | Kaise et al. | |
| 2013/0107151 A1 | 5/2013 | Sasaki et al. | |

FOREIGN PATENT DOCUMENTS

| | | |
|---|---|---|
| CN | 102937768 A | 2/2013 |
| CN | 103268041 A | 8/2013 |
| CN | 203232231 U | 10/2013 |
| WO | 94/19720 A1 | 9/1994 |

OTHER PUBLICATIONS

International Search Report dated Feb. 27, 2014; PCT/CN2013/086903.
First Chinese Office Action Appln. No. 201310184540.5; Dated Feb. 11, 2015.
Extended European Search Report dated Nov. 9, 2016; Appln. No. 13834283.7-1904/2998785 PCT/CN2013086903.

* cited by examiner

LIQUID CRYSTAL DISPLAY PANEL AND DRIVING METHOD THEREOF

FIELD OF THE INVENTION

Embodiments of the present invention relate to a field of liquid crystal display technology, in particular, to a liquid crystal display panel and a driving method thereof.

BACKGROUND

As illustrated in FIG. 1, in a liquid crystal display panel of an advanced dimension switch (ADS) mode, an array substrate 91 and a color filter substrate 92 are bonded to each other, and a common electrode 19 and a pixel electrode 18 are both disposed on the array substrate 91, wherein one of the two electrodes is of plate-shape, and the other one is a slit electrode disposed above the plate-shape electrode (in FIG. 1, the dashed line between various slit electrodes indicates that they are electrically connected, and the following is the same), and an insulation layer 8 is disposed between the two electrodes; since the two electrodes are very close in distance, the two electrodes may be directly used as two poles of a storage capacitor (Cst).

With the improvement of resolution of display apparatus, size of a pixel unit p (that is, a pixel or subpixel) is continually decreased, and sizes of the common electrode 19 and the pixel electrode 18 are correspondingly decreased, and the facing area of the two poles of the storage capacitor is also decreased, so as to cause the value of the storage capacitor become smaller, and cause problems such as image sticking, flicker and so on.

Meanwhile, a liquid crystal display apparatus is generally driven by a thin film transistor array driving circuit, and the thin film transistor array driving circuit comprises a plurality of gate lines and data lines crossing with each other, and one thin film transistor (TFT) is disposed at each of intersections of the gate lines and the data lines, and the gate line is connected to a gate of the thin film transistor, the data line is connected to a source electrode of the thin film transistor, and a drain electrode of the TFT is connected to the pixel electrode. The positions, where the gate lines, the data lines and TFTs are located, do not transmit light, that is, these positions can not be used for displaying. As the improvement of the resolution, the size of the pixel unit and the distance between the pixel units are both decreased, and the number of the pixel units under the same area is increased.

However, the decreasing of the sizes of the above gate lines, data lines, thin film transistors and so on is under certain limitation, and their number should match the pixel units, so the number of the gate lines, data lines, thin film transistors and so on is increased as the resolution is increasing, and the ratio of occupied area by them (that is, area which does not transmit light) is larger, which may cause an aperture ratio of the liquid crystal display panel to be decreased; meanwhile, since the gate lines, data lines and so on are generally disposed between respective pixel units, the existence of them also influences reduction of the distance between the pixel units, and limits the improvement of the resolution.

SUMMARY

Embodiments of the present invention provide a liquid crystal display panel with a high storage capacitor and a high aperture ratio and a driving method thereof, which may solve problems such as a small storage capacitor or a low aperture ratio existing in the liquid crystal display panel in the prior art. According to one aspect of the present invention, there is provided a liquid crystal display panel, and the liquid crystal display panel may comprise a substrate and a plurality of first electrodes and a plurality of second electrodes disposed on the substrate to generate a driving electrical field, wherein each of the first electrodes may be disposed in two pixel units which are adjacent in a first direction, and each of the second electrodes may be disposed in two pixel units which are adjacent in the first direction, the first electrodes and the second electrodes may be disposed alternately by offsetting one pixel unit in the first direction, and the first direction may be a row direction or a column direction.

In an embodiment, the substrate may comprise a first substrate and a second substrate cell-assembled together. Each of the first electrodes may be of plate-shape, and disposed at an inner side of the first substrate; each of the second electrodes may be as lit electrode, and disposed at an inner side of the first electrodes, and the second electrodes and the first electrodes are insulated from each other and form a storage capacitor.

In an embodiment, the liquid crystal display panel may further comprise a fixed voltage pole connected to a fixed voltage source, and the fixed voltage pole may be disposed between the first electrodes and the first substrate, and the fixed voltage pole and the first electrodes may be insulated from each other and form an auxiliary capacitor.

In an embodiment, the fixed voltage pole may be connected to a ground.

In an embodiment, the liquid crystal display panel may further comprise: a thin film transistor array driving circuit, disposed on the first substrate to control the first and second electrodes, and the thin film transistor array driving circuit comprises a plurality of gate lines and data lines arranged to cross with each other, and thin film transistors disposed at intersections of the gate lines and the data lines, wherein the gate lines are arranged along the first direction.

In an embodiment, the data lines may comprise a first data line and a second data line; the plurality of first and second electrodes arranged along the first direction may be connected with the same gate line by a plurality of thin film transistors, respectively; the plurality of first electrodes arranged along a direction perpendicular to the first direction may be connected with the same first data line by a plurality of thin film transistors, respectively; the plurality of second electrodes arranged along the direction perpendicular to the first direction may be connected with the same second data line by a plurality of thin film transistors, respectively.

In an embodiment, the substrate may comprise a first substrate and a second substrate cell-assembled together, wherein the first electrodes may be disposed at an inner side of the first substrate, a first storage pole may be disposed between the first electrodes and the first substrate, and the first storage pole and the first electrodes may be insulated from each other and form a first storage capacitor; the second electrodes may be disposed at an inner side of the second substrate, a second storage pole may be disposed between the second electrodes and the second substrate, and the second storage pole and the second electrodes may be insulated from each other and form a second storage capacitor.

In an embodiment, the liquid crystal display panel may further comprise: a first thin film transistor array driving circuit, disposed on the first substrate to control the first electrode, wherein the first thin film transistor array driving circuit may comprises a plurality of first gate lines and first data lines arranged to cross with each other, and first thin film transistors disposed at intersections of the first gate lines and the first data lines, wherein the first gate lines are arranged along the first direction; and a second thin film transistor array driving circuit, disposed on the second substrate to control the second electrodes, and the second thin film transistor array driving circuit comprises a plurality of second gate lines and second data lines arranged to cross with each other, and second thin film transistors disposed at intersections of the second gate lines and the second data lines, wherein the second gate lines are arranged along the first direction.

In an embodiment, the projections of the first gate lines and the second gate lines on the first substrate may at least partially overlap; and/or the projections of the first data lines and the second data lines on the first substrate may at least partially overlap; and/or the projections of the first thin film transistors and the second thin film transistors on the first substrate may at least partially overlap.

In an embodiment, the first storage pole may be the first gate lines or the first data lines; and/or the second storage pole may be the second gate lines or the second data lines.

"Forming capacitor" by two poles or electrodes described here refers to that the two poles/electrodes have a certain area of directly facing with each other, and the distance between them is relatively small (that is, disposed on the same substrate), and at the same time, they are insulated from each other (that is, separated by an insulation layer).

In the display panel of the embodiment of the present invention, if the first electrodes and the second electrodes are both located on the first substrate, they may be directly used as two poles of the storage capacitor, and since each electrode corresponds to two pixel units, which is equivalent to increase the pole area of the storage capacitor, the value of its storage capacitor is relatively large, and it may reduce malfunction and improve display quality; if the first electrodes and the second electrodes are located on two substrates, respectively, the projections of their driving circuits on the substrate may completely or partially overlap, and thus the area of the liquid crystal display panel which does not transmit light is relatively small, and the aperture ratio is high, and the distance between respective pixel units is relatively small, the resolution is high.

According to another aspect of the present invention, there is further provided a driving method of the above liquid crystal display panel, and the method comprises:

Providing driving voltages to each of the first electrodes and second electrodes, respectively, wherein driving electrical fields of respective pixel units may be determined by a difference of driving voltages of the first electrodes and the second electrodes in the pixel units.

In an embodiment, with respect to a liquid crystal display panel in which the above first and second electrodes are both located on the first substrate, providing driving voltage to the first electrodes and providing driving voltage to the second electrodes opposed to the first electrodes may be ended at the same time.

In an embodiment, with respect to a liquid crystal display panel having the above fixing voltage pole, a starting time of providing driving voltage to the first electrodes may be earlier than a starting time of providing driving voltage to the second electrodes opposed to the first electrodes; and an ending time of providing driving voltage to the first electrodes may be later than an ending time of providing driving voltage to the second electrodes opposed to the first electrode.

Since the driving method of liquid crystal display panel of the present invention is to drive the above liquid crystal display panel, it may have a large storage capacitor, few malfunction, high display quality, and high aperture ratio and resolution.

The embodiments of the present invention may be applied to various liquid crystal display apparatuses, such as a liquid crystal display apparatus of ADS mode, and a liquid crystal display apparatus of twisted nematic (TN) mode or vertical alignment (VA) mode.

DETAILED DESCRIPTION

To make the technical solutions of the present invention to be better understood by those skilled in the art, the following will give a detailed description on the present invention in connection with the figures and the detailed embodiments.

First Embodiment

As illustrated in FIGS. 2-5, the present embodiment provides a liquid crystal display panel, and the liquid crystal display panel comprises an array substrate 91 (i.e. a first substrate) and a color filter substrate 92 (i.e. a second substrate) cell-assembled together.

It is to be noted that the present embodiment gives an explanation by taking the first substrate as the array substrate and the second substrate as the color filter substrate. The array substrate described by the embodiment of the present invention refers to a substrate disposed with a thin film transistor array driving circuit, and the color filter substrate refers to another substrate which is opposed to and bonded to the array substrate. As to the structure that the color filter is integrated in the array substrate, the embodiments of the present invention also takes "color filter substrate" as the denomination of another substrate bonded to the array substrate, instead of making limitation on its structure. The array substrate and the color filter substrate cell-assembled together refers to that liquid crystal is injected between the array substrate and the color filter substrate manufactured, and it is then sealed by seal agent to form liquid crystal cell.

In addition, as to some other liquid crystal display panels, the liquid crystal and a protection layer covering liquid crystal may be coated after the thin film transistor array driving circuit is disposed on the first substrate, and such protection layer may be also regarded as the second substrate of the present embodiment. That is, the first substrate and the second substrate in the present embodiment refers to a two-layer structure forming liquid crystal cell, not limited to glass substrate, plastics substrate or the like.

Figure 1:
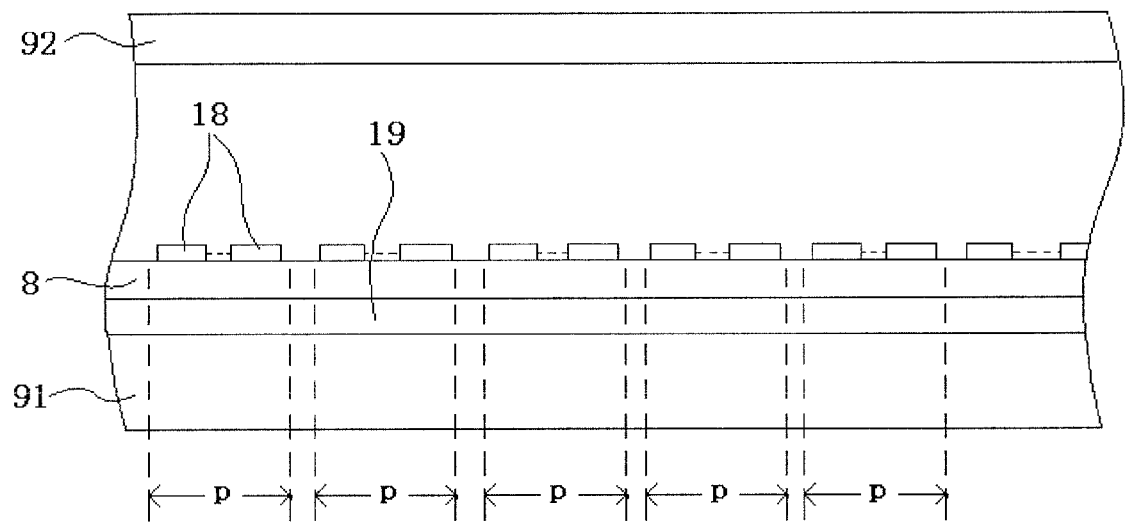
FIG. 1 is a schematic partial sectional structural view of liquid crystal display panel of ADS mode in the prior art (thin film transistor array driving circuit and so on not illustrated)
Figure 2:
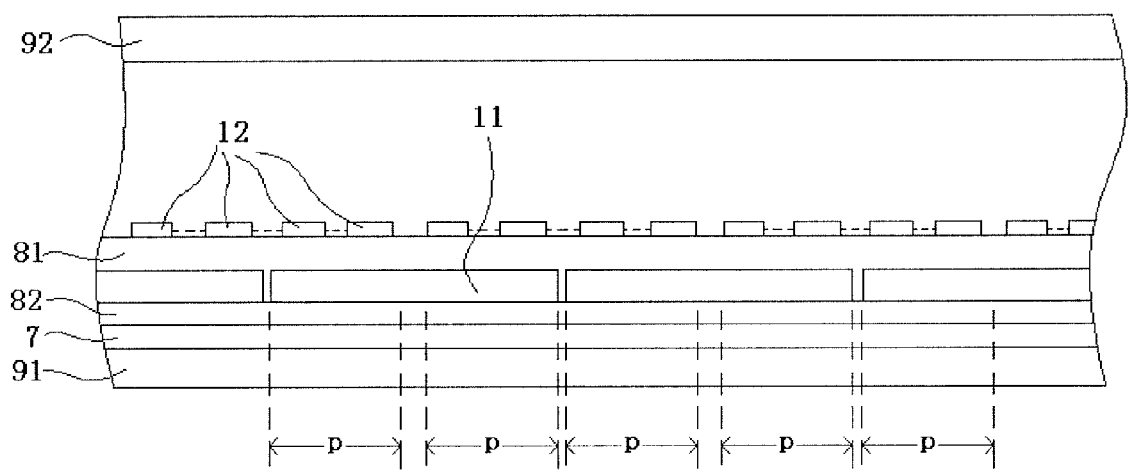
FIG. 2 is a schematic partial sectional structural view of a liquid crystal display panel of a first embodiment of the present invention (thin film transistor array driving circuit and so on not illustrated)

As illustrated in FIG. 2, a first electrode 11 may be disposed at an inner side of the array substrate 91, and the first electrode 11 may be a plate-shaped electrode, and a first insulation layer 81 may cover the first electrode 11; a second electrode 12 is disposed on the first insulation layer 81 (that is, at the inner side of the first electrode 11), and the second electrode 12 may be a slit electrode, so that it may form a storage capacitor with the first electrode 11, and may generate a driving electrical field with the first electrode 11. That is, in the liquid crystal display panel of the present embodiment, two types of electrodes are both located on the array substrate 91, and it is of ADS mode.

It is to be noted that the inner side of the first substrate or the array substrate described in the present embodiment refers to a side of the substrate which is used to form the thin film transistor array driving circuit, that is, above the first substrate or the array substrate in the figure.

In each row (that is, in a first direction), each first electrode 11 may be disposed in two adjacent pixel units p, each second electrode 12 may also be disposed in two adjacent pixel units p, and the first electrode 11 and the second electrode 12 may be alternately disposed by offsetting one pixel unit p. That is, each pixel unit p may correspond to one half of the first electrode 11 and one half of the second electrode 12, the two pixel units p opposed to one first electrode 11 may correspond to one half of each of the two second electrodes 12, and the two pixel units p opposed to one second electrode 12 may correspond to one half of each of the two first electrodes 11.

In the liquid crystal display panel of the present embodiment, each electrode may correspond to two pixel units p, and facing area of the first and second electrodes is relative large, and thus the value of the storage capacitor corresponding to each pixel unit p is relatively large, thus it may avoid malfunctions such as image sticking, flicker, and so on, and improve display quality.

Of course, according to the above manner, there might occur the case that some electrodes correspond to only one pixel unit, at two ends of each row; as to such case, it may "float" half of such electrode and not used to drive, or it may also separately dispose an electrode corresponding to one pixel unit p at the edge, or it may not use the pixel unit p at the edge to perform displaying, and the present invention does not give restriction on it.

Preferably, it may further dispose a thin film transistor array driving circuit on the array substrate 91 to control respective first electrodes 11 and second electrodes 12. The thin film transistor array driving circuit may be of conventional form, that is, it may comprise a plurality of gate lines 51 and data lines arranged to cross with each other, wherein the gate lines 51 are arranged along the row direction; a thin film transistor 53 is disposed at each intersection of the gate lines 51 and the data lines, the gate line 51 is connected to the gate of the thin film transistor 53, the data line is connected to the source electrode of the thin film transistor 53, and a drain electrode of the thin film transistor 53 is connected to the first electrode 11 or the second electrode 12, so as to achieve the control of the electrode.

Figure 3:
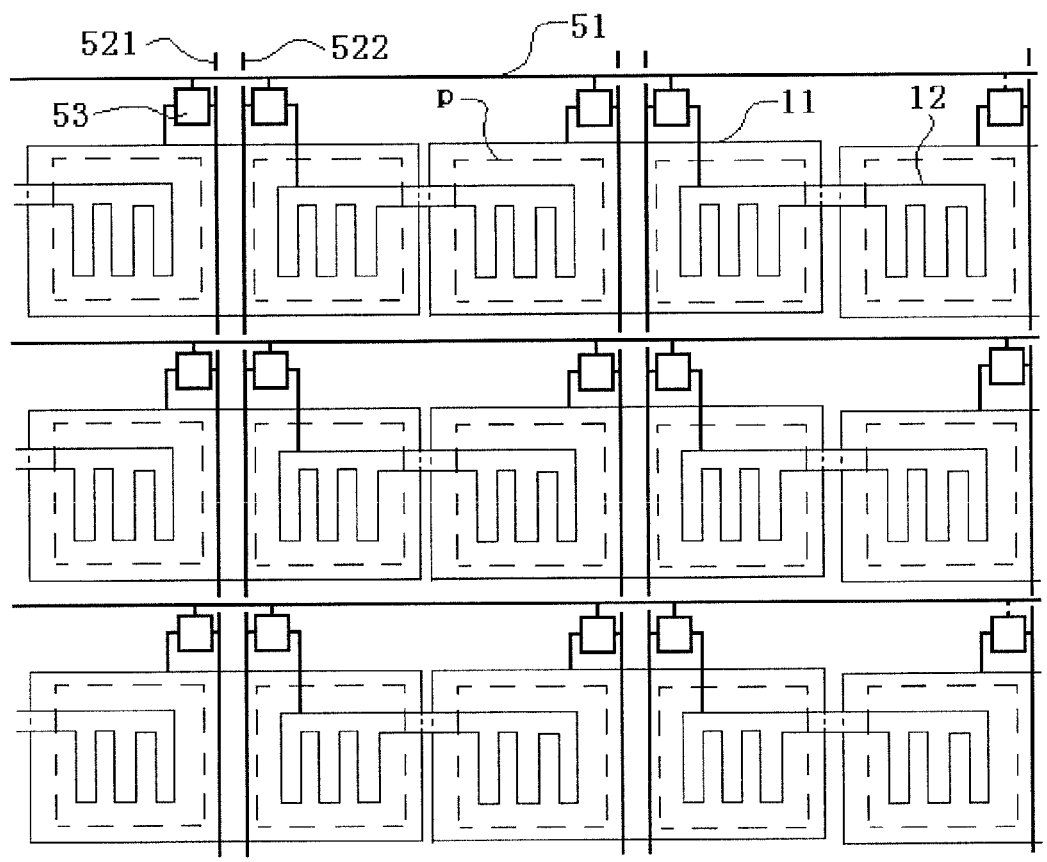
FIG. 3 is a schematic partial top structural view of an array substrate of the liquid crystal display panel of the first embodiment of the present invention (the fixing pole and so on not illustrated)

Preferably, as illustrated in FIG. 3, each of the first electrodes 11 and the second electrodes 12 in the same row may be connected to the same gate line 51, and each of the first electrodes 11 in the same column may be connected to the same first data line 512, and each of the second electrodes 12 in the same column may be connected to the same second data line 522. That is, each gate line 51 may simultaneously control one row of first electrodes 11 and second electrodes 12, each first data line 521 may control one column of first electrodes 11, and each second data line 522 may control one column of second electrodes 12.

The advantages of such arrangement lie in: on one hand, since the gate line 51 simultaneously control two types of electrodes, the number of the gate lines 51 is relatively small, the structure is simple; on the other hand, since each data line control the same type of electrodes, so its control process is more accurate and simple.

Alternatively, the first data line 521 and the second data line 522 may be arranged together by making two as a group, and disposed between adjacent second electrodes 12, and thus it may avoid the influence of the leads on the electrical field of the slit electrode (that is, the second electrode 12), and improves distribution of the electrical field and improves display quality.

Of course, it is also possible to use other driving circuit to control various electrodes (for example, the first and second electrodes 11 and 12 may correspond to different gate lines 51, respectively), as long as it can independently control the driving voltage of various electrodes.

The driving manner of the liquid crystal display panel of the present embodiment may comprise: providing driving voltages to each of the first electrodes 11 and second electrode 12, respectively, wherein driving electrical field of respective pixel units p is determined by a difference of driving voltages of the first and second electrodes 11 and 12 in the pixel unit p. In particular, the calculation equation of the voltage of each pixel unit p is as follows:

$$Vp1=|V1\text{-}1-V2\text{-}1|;$$

$$Vp2=|V1\text{-}2-V2\text{-}1|;$$

$$Vp3=|V1\text{-}2-V2\text{-}2|;$$

$$Vp4=|V1\text{-}3-V2\text{-}2|;\ldots$$

and so on.

Wherein, Vpn refers to the voltage in the $n_{th}$ pixel unit p, V1-$n$ refers to the driving voltage of the $n_{th}$ first electrode, and V2-$n$ refers to the driving voltage of the $n_{th}$ second electrode.

It can be seen that the driving manner of the liquid crystal display panel of the present embodiment has no difference in principle from the prior art, and they both apply certain driving voltages to two electrodes in the pixel unit p so as to generate a certain driving electrical field.

However, different from the prior art, there is no common electrode having uniform voltage in the liquid crystal display panel of the present embodiment, and instead, the driving voltages of the two electrodes may both change, and the first electrodes 11 and the second electrodes 12 are alternately disposed; thus, the driving voltages of various electrode in the row may be concluded step by step from one end of one row of pixel units p according to the above method.

Of course, since the driving voltages of all the electrodes may vary, with respect to certain particular voltage distribution (i.e. gray scale distribution) of one row of pixel units p, each of the first electrodes 11 and the second electrodes 12 may have countless possible driving voltage values (as the simplest example, the driving voltages of all electrodes change by the same value, but their driving voltage differences remain the same, so the final driving effect remains the same); thus, it may choose proper driving voltages according to detailed situations of the apparatus (such as, the voltage scope, which can be provided by the driving chip), and since the detailed calculating process of choosing driving voltages may be achieved by many different known methods (for example, conclude step by step or solve system of equations, etc.), so it is not described in detail here.

Since each row and each column of the liquid crystal display panel have a plurality of pixel units, in order to avoid the voltage value of the first electrode 11 or the second electrode 12 at the start end or tail end to be too large due to concluding the driving voltages step by step, it may adopt the manner of dividing one row or column of pixel units into groups and driving by groups, for example, ten pixel units is divided into a group, and the value of driving voltage of the first electrodes or second electrodes corresponding to the first ten pixel units is concluded sequentially from the value of driving voltage of the first electrode or second electrode corresponding to the starting pixel unit of each row, then the value of driving voltage of the first electrodes or second electrodes corresponding to subsequent ten pixel units is concluded according to the same method, . . . and so on, so as to obtain the value of driving voltages of the first electrodes or second electrodes corresponding to respective pixel units in each row. Of course, the embodiments of the present invention do not give any restriction on the number of the pixel units forming a pixel group and the position relationship of row and column. By the manner of dividing the pixel units into groups and performing driving, it may perform control on each pixel unit more conveniently, and may simplify the calculation, and cause the driving to be simpler.

Preferably, providing driving voltage to the first electrode 11 and providing driving voltage to the second electrode 12 opposed to the first electrode 11 may be ended at the same time. That is, preferably, the driving signals on the first electrode 11 and the second electrode 12 may be ended at the same time, so that it may guarantee the voltage stored by the storage capacitor formed by them to be more accurate, and improve display effect.

Here, "the second electrode 12 opposed to the first electrode 11" refers to that the two electrodes overlap with each other in certain pixel unit p, and since the first electrodes 11 and the second electrodes 12 in each row are disposed alternately, they are actually "alternately opposite to", and thus the driving signals of the first electrode 11 in the same row are preferably synchronous, and the driving signals of the second electrode 12 in the same row are preferably synchronous.

Figure 4:
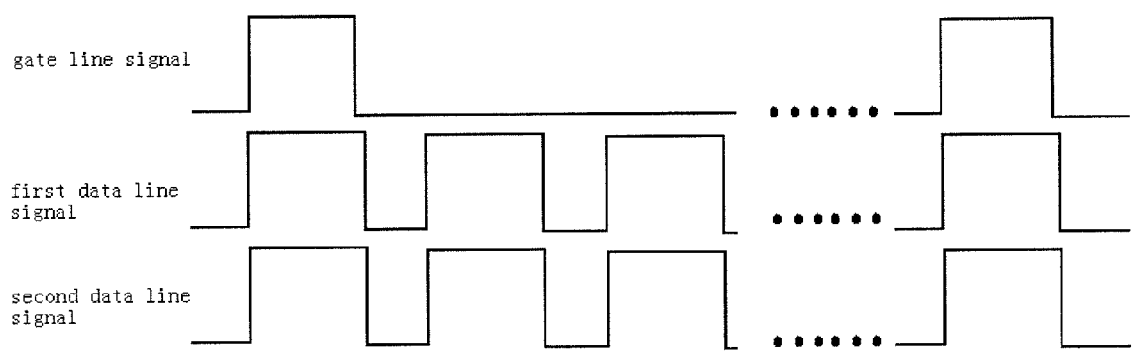
FIG. 4 is a schematic view of a driving waveform of the liquid crystal display panel of the first embodiment of the present invention.

In detail, the waveform of the driving signals in the gate lines 51, the first data lines 521, and the second data lines 522 may be as illustrated in FIG. 4: the conducting signal of the gate line 51 first ends, then the driving signals of the first data lines 521 and the second data lines 522 (which are signals corresponding to the gate line 51) ends; of course, after the conducting signal of the gate line 51 ends, no matter whether there is signal in the data line, the electrodes does not receive signals, and thus the above aim of simultaneously ending the above driving signals may be easily achieved by the method of turning off the gate line 51 in advance. Of course, if the time precision of signal control is enough high, it may directly simultaneously end the driving signals of the first data line 521 and the second data line 522.

Since the voltage in the storage capacitor is mainly determined by the driving signals on the two data lines when the gate line 51 is turned off, the starting sequence of the driving signals in the gate lines 51, the first data lines 521, and the second data lines 522 may be not defined.

Preferably, as illustrated in FIG. 2, a fixed voltage pole 7, connected to a fixed voltage source, may be further disposed between the array substrate 91 and the first electrode 11. The fixed voltage pole 7 may be disposed to be opposed to the first electrode 11, and a second insulation layer 82 is disposed therebetween, so that the fixed voltage pole 7 may also form a capacitor (auxiliary capacitor) with the first electrode 11.

Here, the fixed voltage source refers to any source disposed in the liquid crystal display panel, which may maintain a stable voltage, and it may be a lead separately connected and maintaining a certain voltage; however, preferably, to simplify product structure, the fixed voltage pole 7 may generally be directly connected to the ground (since the liquid crystal display panel comprises a plurality of ground ports).

Since it is all right as long as the fixed voltage poles 7 in different pixel units p maintain the same voltage, the fixed voltage poles 7 are preferably an integral plate-shaped pole as illustrated in FIG. 2 to simplify manufacturing process (of course, the fixed voltage poles 7 in each pixel unit p may be also independent from each other).

In the liquid crystal display panel of the present embodiment, two types of electrodes are independently controlled, that is, two poles of the storage capacitor do not have input signals at the storing stage (it refers to a stage that the driving electrical field is maintained by depending on the storage capacitor), so the storage capacitor can only maintain a certain voltage difference at this time, and can not maintain a certain voltage value, so the stability is relatively poor, which may cause certain influence on the display effect. Thus, fixed voltage poles 7 having stable voltage may be disposed, and the fixed voltage poles 7 may form capacitor with the first electrodes 11, so as to make the first electrodes 11 maintain certain voltages, and further make the second electrodes 12 maintain certain voltages, so as to improve display effect.

Preferably, when it is disposed with fixed voltage poles 7, the driving process of the liquid crystal display panel may further meet the following conditions: a starting time of providing driving voltage to the first electrode 11 is earlier than a starting time of providing driving voltage to the second electrode 12 opposed to the first electrode; and an ending time of providing driving voltage to the first electrode 11 is later than an ending time of providing driving voltage to the second electrode 12 opposed to the first electrode 11.

That is, the driving signals on the first electrodes 11 and the second electrodes 12 may also have a sequence. Since it has fixed voltage poles 7 at this time, such driving manner may first complete charging on the first electrode 11 (that is, determining the voltage), then complete charging on the second electrode 12, so as to guarantee the storage capacitor to obtain a proper voltage, and achieve a best display effect.

Figure 5:
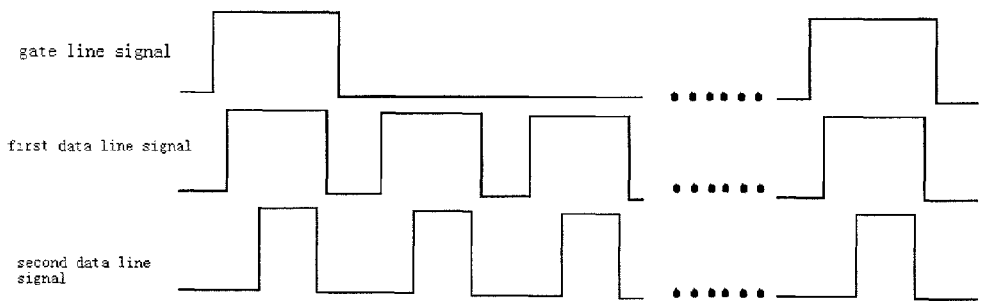
FIG. 5 is a schematic view of another driving waveform of the liquid crystal display panel of the first embodiment of the present invention.

In particular, the waveforms of the driving signals in the gate lines 51, the first data lines 521, and the second data lines 522 are illustrated in FIG. 5: the conducting signal of the gate line 51 starts earlier than the driving signal of the first data line 521 and ends later than the driving signal of the first data line 521; moreover, the driving signal of the first data line 521 starts earlier than the driving signal of the second data line 522, and ends later than the driving signal of the second data line 522. Compared with the above manner in which the gate line 51 is turned off in advance, this manner has a lower requirement on the turning off property of the thin film transistor 53.

Second Embodiment

Figure 6:
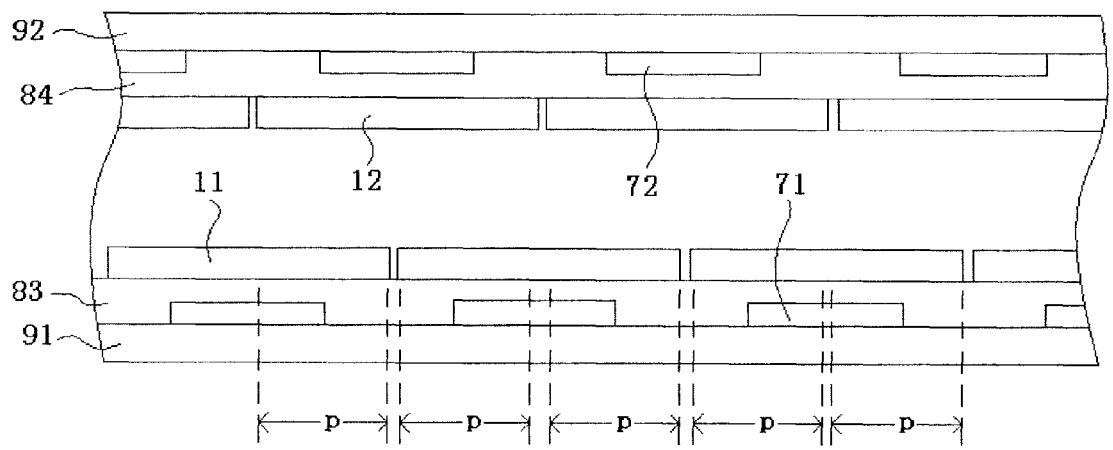
FIG. 6 is a schematic partial sectional structural view of a liquid crystal display panel of a second embodiment of the present invention (thin film transistor array driving circuit and so on not illustrated).

As illustrated in FIG. 6, the present embodiment provides a liquid crystal display panel, and the structure of the liquid crystal display panel is similar to that of the first embodiment, and both have an array substrate 91 (i.e. a first substrate) and a color filter substrate 92 (i.e. a second substrate) cell-assembled together, and first electrodes 11 and second electrodes 12 disposed alternately.

The present embodiment differs from the liquid crystal display panel of the first embodiment in that: in the liquid crystal display panel of the present embodiment, the first electrode 11 is disposed at an inner side of the array substrate 91, and the second electrode 12 is disposed at an inner side of the color filter substrate 92; and both of the two electrodes are preferably plate-shape electrode.

That is, in the liquid crystal display panel of the first embodiment, the first electrode 11 and the second electrode 12 may be respectively disposed on two substrates, that is, it is liquid crystal display panel of TN mode or VA mode.

It is to be noted that, "an inner side of the array substrate" and "an inner side of the color filter substrate" described in the present embodiment both refer to a side close to a liquid crystal layer, that is, in the figures, the inner side of the array substrate is above the array substrate, and the inner side of the color filter substrate is under the color filter substrate.

Of course, since the two substrates of the liquid crystal display panels of the present embodiment are both disposed with electrodes which needs to be independently controlled, they may be both called as "array substrate", but for the sake of convenient description, in the present embodiment, the substrate disposed with the color filter is still called as a color filter substrate 92, and the substrate opposed to the color filter substrate 92 is called as an array substrate 91. Thus, it should be understood, the above "array substrate", "color filter substrate" and so on are only designation of the substrate, and do not make restriction on its structure. As to the structure in which the color filter is integrated in the array substrate, it may also apply the solution of the embodiment of the present invention to perform electrode design and driving. Thus, the array substrate and the color filter substrate described in the embodiment of the present invention are only designation used for the sake of convenient description, and they actually refer to first and second substrate cell-assembled together.

A first storage pole 71 may be further disposed between the first electrode 11 and the array substrate 91, and the first storage pole 71 may form a first storage capacitor with the first electrode 11 (a third insulation layer 83 is disposed between the first storage pole 71 and the first electrode 11); a second storage pole 72 may be further disposed between the second electrode 12 and the color filter substrate 92, and the second storage pole 72 may form a second storage capacitor with the second electrode 12 (a fourth insulation layer 84 is disposed between the second storage pole 72 and the second electrode 12).

Since the first electrode 11 and the second electrode 12 both need to be independently controlled at this time, and the two electrodes are located on different substrates respectively, they need to form storage capacitors respectively to maintain respective voltages at the storing stage. To this end, the first storage pole 71 and the second storage pole 72 may be respectively disposed on the array substrate 91 and the color filter substrate 92, and form storage capacitors with the first electrode 11 and the second electrode 12 respectively.

Preferably, a first thin film transistor array driving circuit may be further disposed on the array substrate 91 to control the first electrode 11, wherein the first thin film transistor array driving circuit comprises a plurality of first gate lines and first data lines arranged to cross with each other, and first thin film transistors disposed at intersections of the first gate lines and the first data lines, wherein the first gate lines are arranged along the first direction; and a second thin film transistor array driving circuit may be further disposed on the color filter substrate 92 to control the second electrodes, and the second thin film transistor array driving circuit comprises a plurality of second gate lines and second data lines arranged to cross with each other, and second thin film transistors disposed at intersections of the second gate lines and the second data lines, wherein the second gate lines are arranged along the first direction. That is, since the first electrode 11 and the second electrode 12 are respectively located on two substrates, it may dispose corresponding driving circuits on the two substrates respectively.

Preferably, the projections of the first gate line and the second gate line on the array substrate 91 may at least partially overlap; and/or the projections of the first data line and the second data line on the array substrate 91 may at least partially overlap; and/or the projections of the first thin film transistor and the second thin film transistor on the array substrate 91 may at least partially overlap. That is, preferably, the projections of the driving circuit (gate lines, data lines, thin film transistors) on the two substrates on the array substrate 91 (of course, it may also be the color filter substrate 92) may partially or completely overlap.

Of course, in the case that the number of the pixel units p is the same, the number of the electrodes needed to be independently controlled in the liquid crystal display panel of the present embodiment is the same as the liquid crystal display panel in the prior art (the liquid crystal display panel in the prior art only needs to control pixel electrode, and there is only one pixel electrode in each pixel unit p; however, it needs to control the first electrode 11 and the second electrode 12 in the liquid crystal display panel of the present embodiment, and "one half" of each electrode is disposed in each pixel unit p); thus, the numbers of the gate lines, the data lines, and the thin film transistors in their driving circuit are also identical. However, since the gate lines, the data lines, and the thin film transistors etc. in the present embodiment is respectively distributed on two substrates, the number of devices on each substrate is only half of that in the prior art; thus, as long as various components on two substrates are located overlapping positions, with respect to liquid crystal display panel, the area occupied by its non-light-transmitting portion is reduced, so as to improve its aperture ratio; meantime, since the number of the leads on each substrate is reduced, the distance between various pixel units p may be smaller, and the resolution may be improved.

Preferably, the above first storage pole 71 may be the first gate line or the first data line; and the second storage pole 72 may be the second gate line or the second data line. That is, it may adopt a technology similar to the existing liquid crystal display panel of TN mode, and take gate line or data line as one pole of the storage capacitor, so as to simplify the structure of the products. Of course, it may also adopt separately disposed storage pole.

It should be understood that although the above embodiments take "the row direction" as the example of the first direction, it is also completely possible to take "the column direction" as the first direction, as long as the directions of the gate lines, the data lines, etc. correspondingly change, and it is not described in detail here.

It should be understood that although the above embodiments take the color filter substrate as the second substrate, other forms of substrate arrangement is also possible, such as there is no color filter (that is, it may be non-color displaying), or the color filter may also be disposed on the array substrate (that is, of COA manner).

It should be understood that the liquid crystal display panels of the above various embodiments may further comprise other known structures, such as spacer, seal agent, liquid crystal, color filter, etc., and it is not described in detail here.

Third Embodiment

The present embodiment provides a liquid crystal display apparatus, which comprises the above liquid crystal display panel.

The liquid crystal display apparatus of the present embodiment may be any product or component having displaying function, such as an electronic paper, a mobile phone, a tablet PC, a television, a display, a notebook computer, a digital photo frame, a navigator and so on.

Of course, the liquid crystal display apparatus of the present embodiment may further comprise other known structures, such as a backlight source, a power source unit, a frame, etc.

Since the liquid crystal display apparatus of the present embodiment comprise the above liquid crystal display panel, it also have the advantages of large capacitor, few malfunctions, high display quality, and high aperture ratio and resolution.

It may be understood that the above embodiments are merely exemplary embodiments used to explain the principles of the present invention; however, the present invention is not limited thereto. Those with ordinary skills in the art may make various modifications and changes without departing the spirit and essential of the present invention, and these modifications and changes should be regarded within the protection scope of the present invention.

What is claimed is:

1. A liquid crystal display panel, comprising:
a substrate and a plurality of first electrodes and a plurality of second electrodes disposed on the substrate to generate a driving electrical field,
wherein each of the first electrodes is disposed in two pixel units which are adjacent in a first direction, and each of the second electrodes is disposed in two pixel units which are adjacent in the first direction, the first electrodes and the second electrodes are disposed to be offset from each other by one pixel unit in the first direction, and the first direction is a row direction or a column direction,
wherein the substrate comprises a first substrate and a second substrate cell-assembled together, wherein
each of the first electrodes is an electrode of plate shape, and disposed at an inner side of the first substrate;
each of the second electrodes is a slit electrode, and disposed at an inner side of the first electrode, and the second electrodes and the first electrodes are insulated from each other and form a storage capacitor.

2. The liquid crystal display panel according to claim 1, further comprising:
a fixed voltage pole connected to a fixed voltage source, wherein the fixed voltage pole is disposed between the first electrodes and the first substrate, and the fixed voltage pole and the first electrodes are insulated from each other and form an auxiliary capacitor.

3. The liquid crystal display panel according to claim 2, wherein the fixed voltage pole is connected to a ground.

4. The liquid crystal display panel according to claim 1, further comprising:
a thin film transistor array driving circuit, disposed on the first substrate to control the first and second electrodes, wherein the thin film transistor array driving circuit comprises a plurality of gate lines and data lines arranged to cross with each other, and thin film transistors disposed at intersections of the gate lines and the data lines, wherein the gate lines are arranged along the first direction.

5. The liquid crystal display panel according to claim 4, wherein the data lines comprise a first data line and a second data line; and
the plurality of first and second electrodes arranged along the first direction are connected with the same gate line by a plurality of thin film transistors, respectively;
the plurality of first electrodes arranged along a direction perpendicular to the first direction are connected with the same first data line by a plurality of thin film transistors, respectively;
the plurality of second electrodes arranged along the direction perpendicular to the first direction are connected with the same second data line by a plurality of thin film transistors, respectively.

6. The liquid crystal display panel according to claim 1, wherein the substrate comprises a first substrate and a second substrate cell-assembled together, wherein
the first electrodes are disposed at an inner side of the first substrate, a first storage pole is disposed between the first electrodes and the first substrate, and the first storage pole and the first electrodes are insulated from each other and form a first storage capacitor;
the second electrodes are disposed at an inner side of the second substrate, a second storage pole is disposed between the second electrodes and the second substrate, and the second storage pole and the second electrodes are insulated from each other and form a second storage capacitor.

7. The liquid crystal display panel according to claim 6, further comprising:
a first thin film transistor array driving circuit, disposed on the first substrate to control the first electrode, wherein the first thin film transistor array driving circuit comprises a plurality of first gate lines and first data lines arranged to cross with each other, and first thin film transistors disposed at intersections of the first gate lines and the first data lines, wherein the first gate lines are arranged along the first direction; and
a second thin film transistor array driving circuit, disposed on the second substrate to control the second electrodes, wherein the second thin film transistor array driving circuit comprises a plurality of second gate lines and second data lines arranged to cross with each other, and second thin film transistors disposed at intersections of the second gate lines and the second data lines, wherein the second gate lines are arranged along the first direction.

8. The liquid crystal display panel according to claim 7, wherein
projections of the first gate lines and the second gate lines on the first substrate at least partially overlap; and/or
projections of the first data lines and the second data lines on the first substrate at least partially overlap; and/or
projections of the first thin film transistors and the second thin film transistors on the first substrate at least partially overlap.

9. The liquid crystal display panel according to claim 7, wherein
the first storage pole is the first gate lines or the first data lines; and/or
the second storage pole is the second gate lines or the second data lines.

10. A method of driving a liquid crystal display panel, wherein the liquid crystal display panel comprises a substrate and a plurality of first electrodes and a plurality of second electrodes disposed on the substrate to generate a driving electrical field, wherein each of the first electrodes is disposed in two pixel units which are adjacent in a first direction, and each of the second electrodes is disposed in two pixel units which are adjacent in the first direction, the first electrodes and the second electrodes are disposed alternately by offsetting one pixel unit in the first direction, and the first direction is a row direction or a column direction, and the driving method of the liquid crystal display panel comprises:
providing driving voltages to each of the first electrodes and second electrodes, respectively, wherein driving electrical fields of respective pixel units are determined by a difference of driving voltages of the first electrodes and the second electrodes in the pixel units,
wherein each of the first electrodes is of plate-shape and disposed at an inner side of the first substrate, and each of the second electrodes is a slit electrode and disposed at inner side of the first electrode, and the second electrodes and the first electrodes are insulated from each other and form a storage capacitor, and the driving method further comprises:
providing driving voltage to the first electrodes and providing driving voltage to the second electrodes opposed to the first electrodes are ended simultaneously.

11. The method of driving a liquid crystal display panel according to claim 10, wherein the liquid crystal display panel further comprises a fixing voltage pole connected to a fixed voltage source, the fixing voltage pole is disposed between the first electrodes and the first substrate, and the fixed voltage pole and the first electrodes are insulated from each other and form an auxiliary capacitor, and the driving method further comprises:
a starting time of providing driving voltage to the first electrodes is earlier than a starting time of providing driving voltage to the second electrodes opposed to the first electrodes; and
an ending time of providing driving voltage to the first electrodes is later than an ending time of providing driving voltage to the second electrodes opposed to the first electrodes.

12. The liquid crystal display panel according to claim 2, further comprising:
a thin film transistor array driving circuit, disposed on the first substrate to control the first and second electrodes, wherein the thin film transistor array driving circuit comprises a plurality of gate lines and data lines arranged to cross with each other, and thin film transistors disposed at intersections of the gate lines and the data lines, wherein the gate lines are arranged along the first direction.

13. The liquid crystal display panel according to claim 3, further comprising:
a thin film transistor array driving circuit, disposed on the first substrate to control the first and second electrodes, wherein the thin film transistor array driving circuit comprises a plurality of gate lines and data lines arranged to cross with each other, and thin film transistors disposed at intersections of the gate lines and the data lines, wherein the gate lines are arranged along the first direction.

14. The liquid crystal display panel according to claim 12, wherein the data lines comprise a first data line and a second data line; and
the plurality of first and second electrodes arranged along the first direction are connected with the same gate line by a plurality of thin film transistors, respectively;
the plurality of first electrodes arranged along a direction perpendicular to the first direction are connected with the same first data line by a plurality of thin film transistors, respectively;
the plurality of second electrodes arranged along the direction perpendicular to the first direction are connected with the same second data line by a plurality of thin film transistors, respectively.

15. The liquid crystal display panel according to claim 13, wherein the data lines comprise a first data line and a second data line; and
the plurality of first and second electrodes arranged along the first direction are connected with the same gate line by a plurality of thin film transistors, respectively;
the plurality of first electrodes arranged along a direction perpendicular to the first direction are connected with the same first data line by a plurality of thin film transistors, respectively;
the plurality of second electrodes arranged along the direction perpendicular to the first direction are connected with the same second data line by a plurality of thin film transistors, respectively.

* * * * *